US009501931B1

(12) United States Patent
Lui et al.

(10) Patent No.: US 9,501,931 B1
(45) Date of Patent: Nov. 22, 2016

(54) ON-DEMAND PERFORMANCE OF AN ACTION ASSOCIATED WITH A VEHICLE

(71) Applicant: Verizon Patent and Licensing Inc., Arlington, VA (US)

(72) Inventors: Danny C. Lui, Belle Mead, NJ (US); Musa Kazim Guven, Fort Lee, NJ (US); Jeremy Nacer, Morris Plains, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/711,015

(22) Filed: May 13, 2015

(51) Int. Cl.
G01C 21/00 (2006.01)
G08G 1/127 (2006.01)

(52) U.S. Cl.
CPC .................................. *G08G 1/127* (2013.01)

(58) Field of Classification Search
CPC ..................................................... G08G 1/127
USPC .................... 340/989, 426.1, 426.11, 426.19
See application file for complete search history.

(56) References Cited

U.S. PATENT DOCUMENTS

| 8,022,831 | B1 * | 9/2011 | Wood-Eyre | 340/575 |
|---|---|---|---|---|
| 8,224,313 | B2 * | 7/2012 | Howarter et al. | 455/420 |
| 8,744,745 | B2 * | 6/2014 | Pudar et al. | 701/400 |
| 9,070,276 | B2 * | 6/2015 | Le et al. | 455/414 |
| 9,176,924 | B2 * | 11/2015 | Ricci | 701/1 |
| 2006/0145836 | A1 * | 7/2006 | Miyazaki | B60R 25/045 340/539.1 |
| 2015/0149018 | A1 * | 5/2015 | Attard | G05D 1/0061 701/23 |

OTHER PUBLICATIONS

Wikipedia, "Lojack," http://en.wikipedia.org/wiki/LoJack, Apr. 14, 2015, 3 pages.
Wikipedia, "OnStar," http://en.wikipedia.org/wiki/OnStar, May 7, 2015, 6 pages.

* cited by examiner

Primary Examiner — Brent Swarthout

(57) ABSTRACT

A device may detect a trigger associated with a vehicle. The device may determine registration information, associated with the vehicle, based on detecting the trigger. The registration information may include information associated with a user device associated with the vehicle. The device may determine that the user device is not within a particular distance of the vehicle. The device may provide, to the user device and based on determining that the user device is not within the particular distance of the vehicle, an alert associated with the vehicle. The alert may be provided via a communications network. The device may determine, after providing the alert to the user device, that an action, associated with the vehicle, is to be performed. The device may cause the action, associated with the vehicle, to be performed.

20 Claims, 9 Drawing Sheets

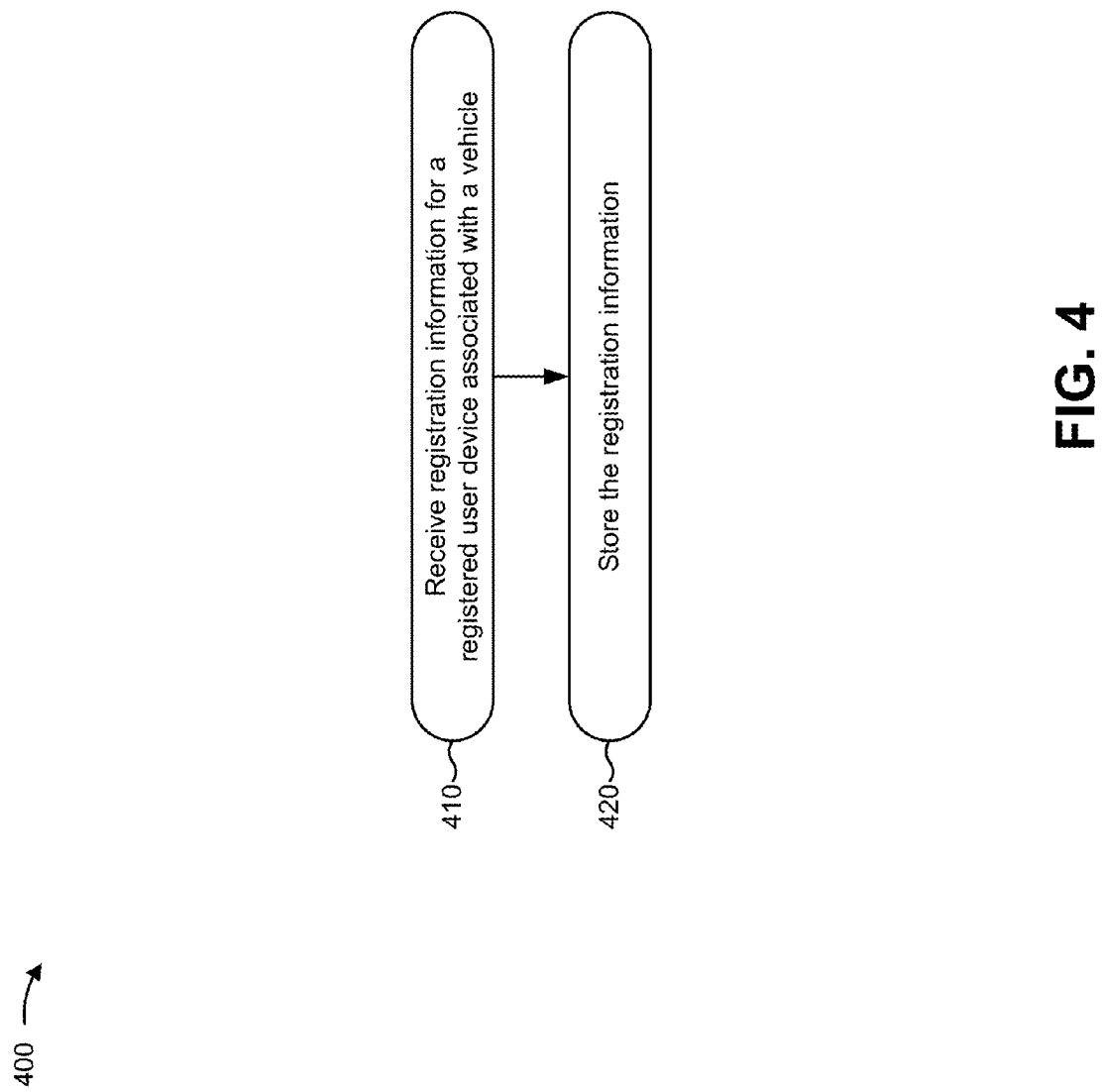

Registration Information User Interface

505 — Registered Devices

RUD 210-1: (123) 456-7890    RUD 210-2: (123) 567-8904
Passcode: 2384               Passcode: 5316
BT Address: 001060AA36F7     BT Address: 101050AC36F9
[Search...]                  [Search...]
        [Add Device]   [Remove Device]

510

515 — Trigger Settings

Triggers:
☑ Ignition          ☐ Force
☑ Non-zero speed    ☐ Location Change

520 — Detect Registered User Devices via:
☐ WiFi   ☑ BlueTooth   ☐ NFC

Alert Settings

525 — Resend Device 1 Alert every [10 minutes ▼] if no response
530 — Alert Device 2 [5 minutes ▼] after Alert to Device 1 if no response
535 — Auto-Track if no response in [20 minutes ▼]

540 — [OK]   [Cancel]

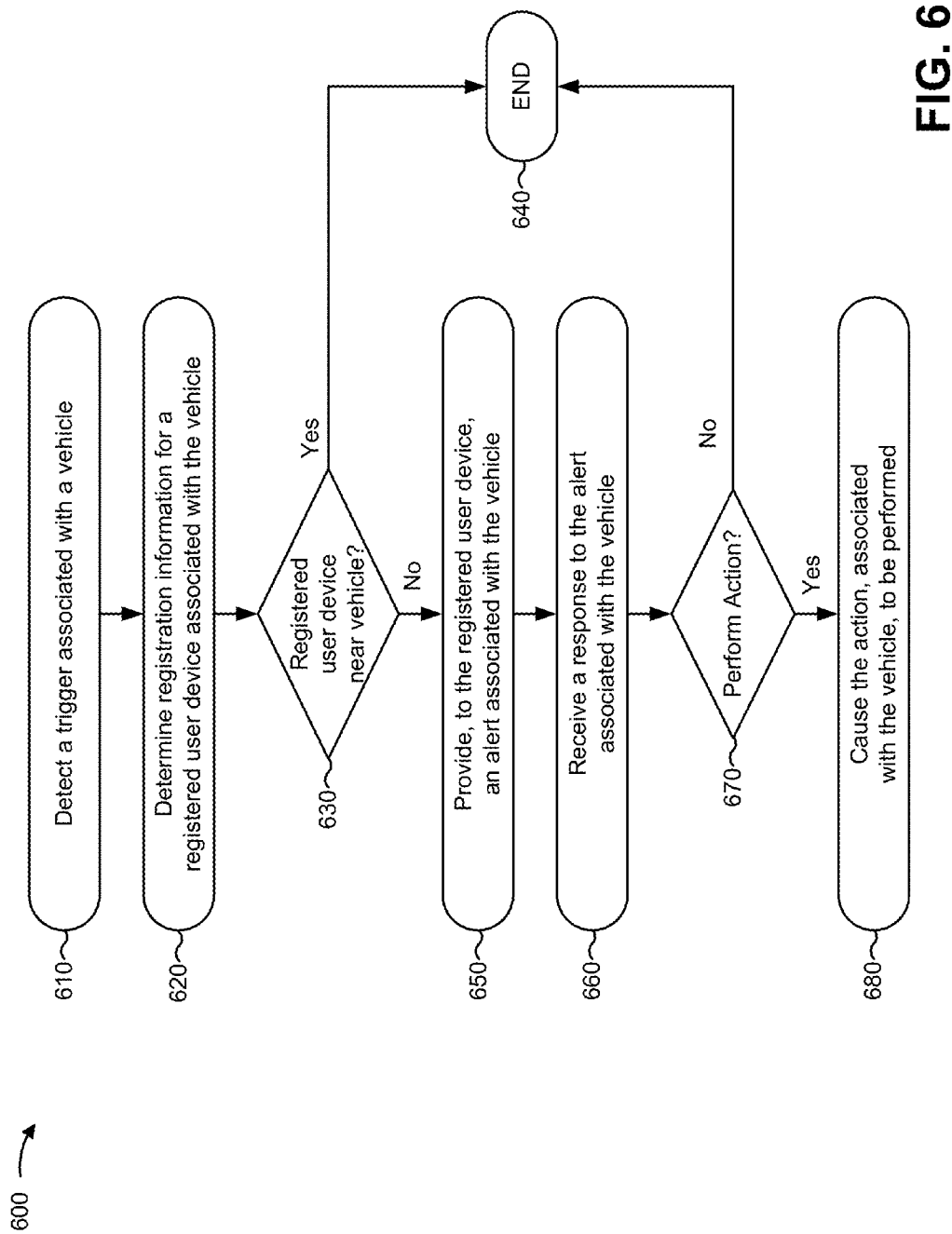

US 9,501,931 B1

ON-DEMAND PERFORMANCE OF AN ACTION ASSOCIATED WITH A VEHICLE

BACKGROUND

A vehicle (e.g., an automobile, an airplane, a boat, etc.) may include a device capable of wireless communication. For example, the vehicle may include a device capable of wireless communication using a cellular technology (e.g., long-term evolution (LTE), third generation (3G), code division multiple access (CDMA), etc.), a wireless local area network technology (e.g., WiFi, Bluetooth, near field communication (NFC)), a geolocation technology (e.g., global positioning system (GPS)), or the like.

BRIEF DESCRIPTION OF THE DRAWINGS

FIG. 4 is a flow chart of an example process for receiving and storing registration information for a user device associated with a vehicle;

FIG. 5 is a diagram of an example implementation relating to the example process shown in FIG. 4;

FIG. 6 is a flow chart of an example process for alerting a user device based on a trigger associated with a vehicle, and providing information, associated with the vehicle, based on alerting the user device.

DETAILED DESCRIPTION OF PREFERRED EMBODIMENTS

The following detailed description of example implementations refers to the accompanying drawings. The same reference numbers in different drawings may identify the same or similar elements.

A user may wish to (e.g., on-demand) cause an action, associated with a vehicle, to be performed when the user is not within or near the vehicle. For example, the user may wish to track a location of the vehicle (e.g., for theft recovery purposes, theft prevention purposes, law enforcement purposes, personal purposes, etc.) when the user is not within or near the vehicle. Traditional methods of vehicle tracking may require the user to subscribe to a vehicle tracking service and/or may require the user to purchase and/or install an external device (e.g., an external transceiver) in order to allow the user to track the location of the vehicle. Moreover, such traditional methods of vehicle tracking may not provide the user with on-demand vehicle tracking (e.g., such that the user may enable vehicle tracking, disable vehicle tracking, initiate vehicle tracking, etc.) at the user's discretion.

In some cases, the vehicle may include a communication device capable of wireless communication via a wireless communications network such as a cellular network (e.g., an LTE network, a 3G network, a CDMA network, etc.). For example, a communication device may be installed in the vehicle (e.g., during production of the vehicle, manufacture of the vehicle, assembly of the vehicle, etc.) that provides for communication via the LTE network, the 3G network, a CDMA network, or the like. Moreover, the user may possess a user device (e.g., a smart phone, a tablet, a laptop, smart watch, a wearable computing device, etc.) capable of wireless communication via the cellular network. As such, a subscription to a vehicle tracking service and/or an installation of an external device may not be necessary in order to provide a user with on-demand vehicle tracking (e.g., since the user device and the vehicle may already be capable of communicating via the cellular network). Moreover, the user device may be capable of communicating, via the cellular network, with the communication device in order to cause another type of action to be performed (e.g., safely disabling the vehicle, communicating with an occupant of the vehicle, etc.) Implementations described herein may provide a user with on-demand vehicle tracking via a cellular network without requiring the user to subscribe to a vehicle tracking service and without requiring the user to install an external device within and/or on the vehicle. Implementations described herein may also allow the user to cause an action, associated with the vehicle, to be performed on-demand when the user is not within or near the vehicle.

Figure 1:
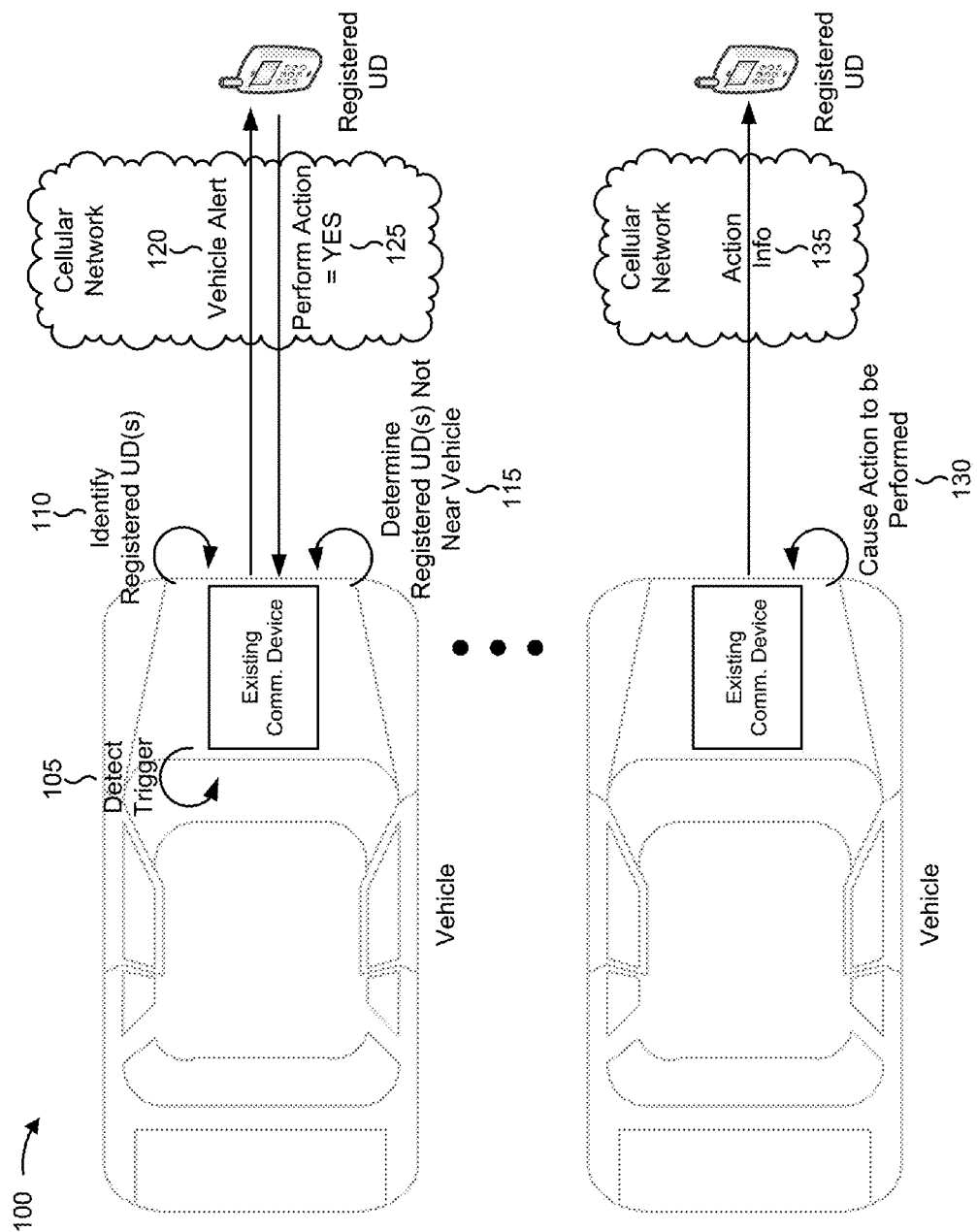
FIG. 1 is a diagram of an overview of an example implementation described herein.

FIG. 1 is a diagram of an overview of an example implementation 100 described herein. For the purposes of example implementation 100, assume that a vehicle includes a communication device (e.g., installed in the vehicle during production, manufacture, assembly, etc.) that is capable of causing an action, associated with the vehicle, to be performed (e.g., determining and providing location information associated with the vehicle). Further, assume that the communication device is capable of communicating via a cellular network, and that the communication device stores or has access to registration information that identifies a registered user device associated with the vehicle (e.g., a user device associated with an owner of the vehicle).

As shown in FIG. 1, and by reference number 105, the communication device may detect a trigger associated with the vehicle. In some implementations, the trigger may include an event, identified by the communication device, that causes an alert, associated with the vehicle, to be provided to a registered user device associated with the vehicle. As shown by reference number 110, the communication device may identify (e.g., based on the registration information) the registered user device. As shown by reference number 115, the communication device may determine (e.g., based on attempting to communicate with the registered user device over WiFi, Bluetooth, NFC, etc.) that the registered user device is not near the vehicle (e.g., not inside or within a threshold distance of the vehicle, not within communication range of the communication device via WiFi, Bluetooth, NFC, etc., or the like). As shown by reference number 120, since the registered user device is not near the vehicle, the communication device may provide, via the cellular network and to the registered user device, an alert associated with the vehicle. In some implementations, the alert may include information associated with inquiring whether the communication device is to cause an action, associated with the vehicle, to be performed (e.g., whether or not the communication device is to provide location information associated with tracking the vehicle).

As shown by reference number 125, the registered user device may receive the alert and may determine (e.g., based on user input) that the communication device is to cause the action to be performed (e.g., that the communication device is to track the vehicle). The user device may provide, via the cellular network and to the communication device, a response to the alert indicating that the communication device is to cause the action, associated with the vehicle, to be performed. As shown by reference number 130, the communication device may receive the response to the alert, and may cause the action to be performed (e.g., the communication device may begin determining location information associated with tracking the vehicle). As shown by reference number 135, the communication device may (e.g., periodically, at a later time) provide information associated with the action (e.g., the location information) to the registered user device via the cellular network. In this way, a communication device, included in a vehicle, may provide on-demand performance of an action associated with a vehicle (e.g., the communication device may provide on-demand vehicle tracking) via a cellular network (e.g., without requiring the user to subscribe to a vehicle tracking service and without requiring the user to install an external device within and/or on the vehicle).

Figure 2:
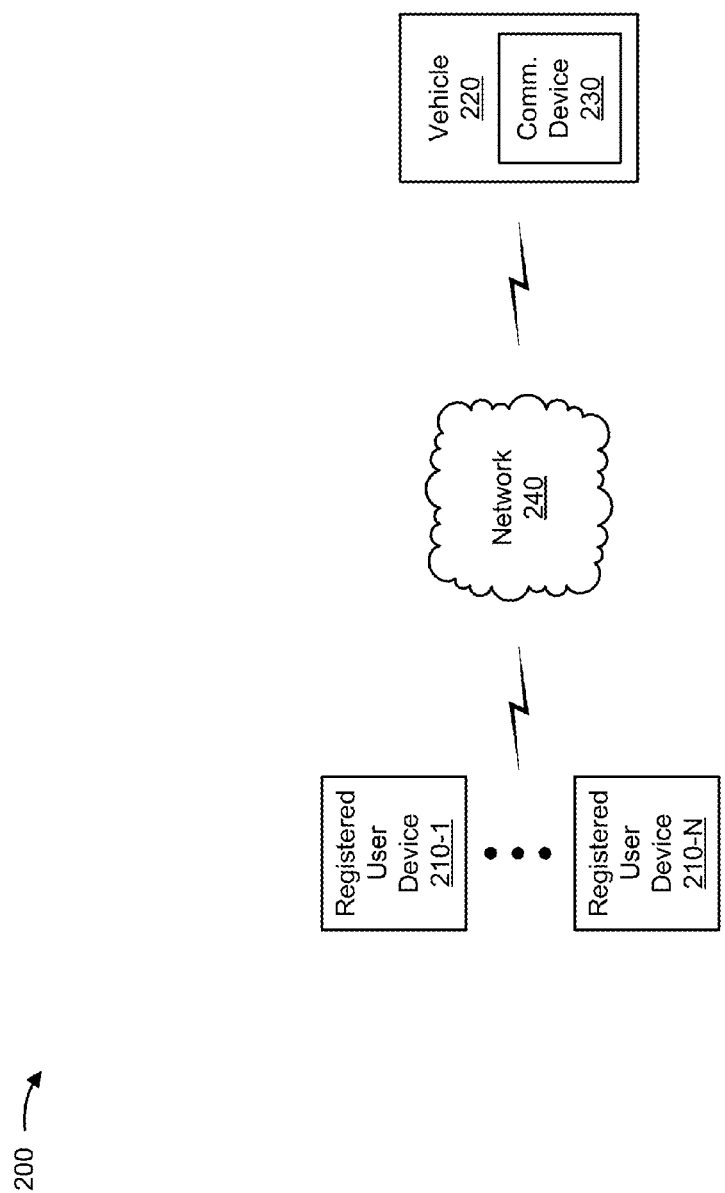
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more registered user devices 210-1 through 210-N (N≥1) (hereinafter referred to collectively as registered user devices 210, and individually as registered user device 210), a vehicle 220 including a communication device 230, and a network 240. Devices of environment 200 may interconnect via wired connections, wireless connections, or a combination of wired and wireless connections.

Registered user device 210 may include one or more devices capable of receiving, generating, storing, processing, and/or providing information associated with performing an action associated with vehicle 220. For example, registered user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, registered user device 210 may be associated with vehicle 220 (e.g., a user of registered user device 210 may be an owner, renter, possessor, etc. of vehicle 220). In some implementations, registered user device 210 may be capable of wirelessly communicating (e.g., with communication device 230) using a cellular technology and/or another type of wireless communication technology (e.g., WiFi, Bluetooth, NFC, etc.).

Vehicle 220 may include an object associated with transporting goods and/or people. For example, vehicle 220 may include an automobile, a truck, a bus, a train, a boat, an airplane, a motorcycle, a bicycle, a cart, or the like. In some implementations, vehicle 220 may be associated with (e.g., owned by, operated by, rented by, used by, etc.) a user of registered user device 210. In some implementations, vehicle 220 may include communication device 230.

Communication device 230 may include a device capable of wirelessly communicating (e.g., with registered user device 210) using a cellular technology and/or another type of wireless communication technology (e.g., WiFi, Bluetooth, NFC, etc.). In some implementations, communication device 230 may be configured with a tracking function associated determining and/or providing location information associated with vehicle 220. For example, communication device 230 may include a transceiver capable of determining location information associated with the vehicle, such as a set of GPS coordinates, a location associated with a cell of network 240 in which vehicle 220 is located, or the like. In some implementations, communication device 230 may be installed in vehicle 220 during production, manufacture, assembly, or the like. In other words, an owner and/or possessor of vehicle 220 need not install communication device 230. Additionally, or alternatively, communication device 230 may be capable of receiving and storing registration information associated with registered user device 210. In some implementations, communication device 230 may be capable of receiving information from and/or providing information to one or more components of vehicle 220, such as an ignition component (e.g., associated with starting vehicle 220), a sensor component (e.g., a speed sensor, a motion sensor, etc.), a geolocation component (e.g., a component associated with determining a geographic location of vehicle 220), or the like.

Network 240 may include one or more wired and/or wireless networks via which registered user device 210 and communication device 230 may communicate. For example, network 240 may include a cellular network (e.g. an LTE network, a 3G network, a CDMA network, etc.). In some implementations, network 240 may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks that may allow wireless communication between registered user device 210 and communication device 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
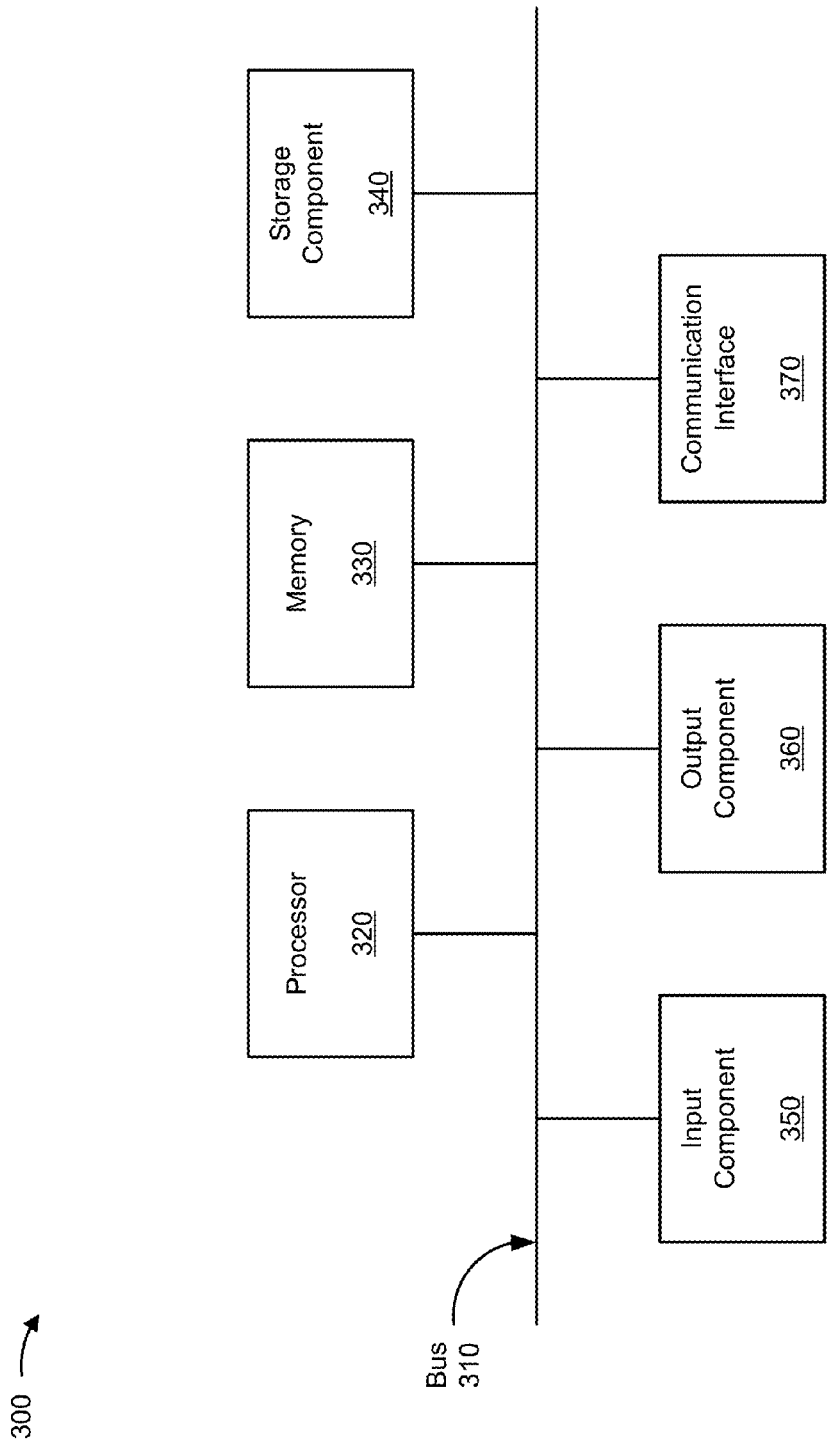
FIG. 3 is a diagram of example components of one or more devices of FIG. 2.

FIG. 3 is a diagram of example components of a device 300. Device 300 may correspond to registered user device 210 and/or communication device 230. In some implementations, registered user device 210 and/or communication device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving and storing registration information for a user device associated with a vehicle. In some implementations, one or more process blocks of FIG. 4 may be performed by communication device 230. In some implementations, one or more process blocks of FIG. 4 may be performed by another device or a set of devices separate from or including communication device 230, such as registered user device 210.

As shown in FIG. 4, process 400 may include receiving registration information for a registered user device associated with a vehicle (block 410). For example, communication device 230 may receive registration information for registered user device 210 associated with vehicle 220. In some implementations, communication device 230 may receive the registration information when communication device 230 receives user input associated with the registration information. Additionally, or alternatively, communication device 230 may receive the registration information when another device provides the registration information, such as registered user device 210 or a server.

The registration information may include information associated with registered user device 210 associated with vehicle 220 (e.g., registered user device 210 to which communication device 230 may provide an alert associated with vehicle 220). For example, the registration information may include information that identifies registered user device 210, such as an international mobile subscriber identity (IMSI) number, an international mobile station equipment identity (IMEI) number, a mobile directory number (MDN), an Internet protocol (IP) address, a Bluetooth address, an NFC chip identifier, or the like. In some implementations, the registration information may also include a passcode associated with registered user device 210. For example, in some implementations, the user of registered user device 210 may need to provide the passcode when responding to an alert (e.g., in order to protect against cloning and/or spoofing of registered user device 210). As another example, the registration information may include information that identifies a means of contacting the user of user device 210, such as a screen name, an email address, a telephone number, or the like (e.g., such that communication device 230 may provide the alert via a messaging application associated with the screen name, via email, via text, etc.).

In some implementations, the registration information may include information indicating when an alert is to be provided to registered user device 210. For example, the registration information may indicate that an alert is not to be provided when registered user device 210 is near vehicle 220 (e.g., in vehicle 220, within 2 meters feet of vehicle 220, within 10 meters of vehicle 220, within a particular distance of vehicle 220, within a communication associated with communication device 230 and/or vehicle 220, in proximity to vehicle 220, etc.), and that an alert is to be provided when registered user device 210 is not near vehicle 220. As another example, the registration information may indicate that an alert is to be provided regardless of whether registered user device 210 is near vehicle 220 (e.g., such that an alert is provided to registered user device 210 upon any detection of a trigger).

Additionally, or alternatively, the registration information may include information associated with a trigger that may be detected by communication device 230. As described above, the trigger may include an event, identified by communication device 230, that causes an alert, associated with tracking vehicle 220, to be provided to registered user device 210. For example, the trigger may be an ignition event (e.g., when vehicle 220 starts, is powered-on, etc.), a non-zero speed event (e.g., when a speed of vehicle 220 increases from zero), a motion event (e.g., when vehicle 220 experiences a window break, an impact, a force, a shake, a vibration, is pushed, is pulled, etc.), a location change event (e.g., when vehicle 220 is moved from a first location to a second location), an acceleration event, a deceleration event, or the like. In some implementations, the registration information may include information that identifies one or more triggers and/or information indicating whether each of the one or more triggers is to cause an alert to be provided to registered user device 210.

Additionally, or alternatively, the registration information may include information associated with detecting whether registered user device 210 is near vehicle 220. For example, the registration information may identify a manner in which communication device 230 may detect whether registered user device 210 is near vehicle 220 (e.g., in vehicle 220, within 2 meters of vehicle 220, within 10 meters of vehicle 220, within communication range of communication device 230, etc.), such as using WiFi technology, Bluetooth technology, NFC technology, or the like. Additionally, or alternatively, the registration information may include information that identifies a time threshold associated with detecting registered user device 210. For example, the registration information may include information that identifies an amount of time (e.g., five seconds, 30 seconds, one minute, etc.) that communication device 230 is to attempt to detect registered user device 210, before determining that registered user device 210 is not near vehicle 220. Additional details regarding detecting registered user device 210 are described below with regard to FIG. 6.

Additionally, or alternatively, the registration information may include information associated with providing an alert to registered user device 210. The alert may include a message (e.g., a short message service (SMS) message, a multimedia messaging service (MMS) message, a voice message, a video message, an email, etc.) associated with determining whether communication device 230 is to cause an action, associated with vehicle 220, to be performed. The action may include, for example, tracking vehicle 220, disabling vehicle 220 (e.g., turning off vehicle 220 when communication device 230 determines that vehicle 220 may be safely disabled, such as when communication device 230 determines that vehicle 220 has stopped), establishing a connection for communications associated with vehicle 220 (e.g., opening a channel to a speaker and a microphone of vehicle 220 to speak with an occupant of vehicle 220, etc), sending a message (e.g., sending a text message to a particular user device), or the like. While implementations and/or methods described herein are described in the context of the action being associated with tracking vehicle 220, these implementations and/or methods may equally apply to one or more other types of actions, such as those listed above.

In some implementations, the registration information may include information associated with providing a second alert when communication device 230 does not receive a response to a first alert (e.g., providing a second alert to a first registered user device 210 when communication device 230 does not receive a response from the first registered user device 210 within a threshold amount of time, providing the second alert to a second registered user device 210 when communication device 230 does not receive a response from the first registered user device 210 within a threshold amount of time, etc.).

Additionally, or alternatively, the registration information may include another type of information, such as priority information associated with multiple registered user devices 210 (e.g., information that identifies an order of the multiple registered user devices 210 to which alerts are to be provided), auto-tracking information (e.g., information indicating that communication device 230 is to automatically track vehicle 220 when communication device 230 does not receive a response to an alert within a threshold amount of time), or another type of information associated with an action that is to be performed.

In some implementations, communication device 230 may receive the registration information based on user input. For example, communication device 230 may receive (e.g., via a display screen associated with communication device 230) user input associated with the registration information. Additionally, or alternatively, communication device 230 may receive the registration based on information provided by another device. For example, communication device 230 may receive the registration information when registered user device 210 provides the registration information (e.g., when registered user device 210 is configured to receive user input associated with the registration information). As another example, communication device 230 may receive the registration when another device (e.g., a device associated with a manufacturer of communication device 230 and/or a manufacturer of vehicle 220, a device associated with providing the on-demand tracking service) provides default registration information (e.g., when user input associated with the registration information has not yet been received).

In some implementations, communication device 230 may receive updated registration information. For example, communication device 230 may receive (e.g., based on user input) registration information associated with a set of registered user devices 210. Here, the user may modify the registration information (e.g., when the user edits registration information associated with an existing registered user device 210, adds registration information associated with a new registered user device 210, deletes registration information associated with an existing registered user device 210, etc.) to create the updated registration information.

As further shown in FIG. 4, process 400 may include storing the registration information (block 420). For example, communication device 230 may store the registration information. In some implementations, communication device 230 may store the registration information after communication device 230 receives the registration information. Additionally, or alternatively, communication device 230 may store the registration information when communication device 230 receives information indicating that communication device 230 is to store the registration information from another device, such as registered user device 210.

In some implementations, communication device 230 may store the registration information in a memory location (e.g., a RAM, a ROM, a cache, a hard disk, etc.) of communication device 230. In some implementations, communication device 230 may store information associated with the registration information such that previous registration information (e.g., registration information received by communication device 230 at an earlier time) is supplemented, modified, overwritten, deleted, or the like. Additionally, or alternatively, communication device 230 may store the registration information such that communication device 230 may retrieve the registration information at a later time (e.g., when detecting a trigger, when determining whether to provide an alert to registered user device 210, when providing the alert to registered user device 210, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram of an example implementation 500 relating to example process 400 shown in FIG. 4. For the purposes of example implementation 500, assume that a user interface, associated with communication device 230, is capable of receiving user input associated with registration information (e.g., for registered user devices 210 associated with vehicle 220).

As shown in FIG. 5, communication device 230 may receive the registration information based on user input provided via input elements of the registration information user interface. As shown by reference number 505, communication device 230 may receive registration information associated with a first registered user device 210 (e.g., the first registered user device: (123) 456-7890, Passcode: 2384, Bluetooth Address: 001060AA36F7). As shown by reference number 510, communication device 230 may receive registration information associated with a second registered user device 210 (e.g., the second registered user device: (123) 567-8904, Passcode: 5316, Bluetooth Address: 101050AC36F9). In this way, communication device 230 may receive registration information associated with multiple registered user devices 210.

As shown by reference number 515, communication device 230 may also receive registration information associated with triggers that may be detected by communication device 230. For example, as shown, the registration information may indicate that an ignition event is to trigger an alert to be provided by communication device 230, that a non-zero speed event is to trigger an alert to be provided by communication device 230, that a motion event is not to trigger an alert to be provided by communication device 230, and that a location change event is not to trigger an alert to be provided by communication device 230.

As shown by reference number 520, communication device 230 may also receive registration information associated with detecting whether registered user device 210 is near vehicle 220. For example, as shown, the registration information may indicate that communication device 230 is to determine whether registered user devices 210 are near vehicle 220 using Bluetooth (e.g., rather than WiFi and/or NFC).

As shown by reference number 525, communication device 230 may also receive registration information associated with a threshold for providing a second alert to the first registered user device 210. For example, as shown, the registration information may indicate that communication device 230 is to provide a second alert to the first registered user device 210 ten minutes after communication device 230 provides a first alert to the first registered user device 210 (e.g., when communication device 230 does not receive a response to the first alert within ten minutes).

As shown by reference number 530, communication device 230 may also receive registration information associated with a threshold for providing an alert to the second registered user device 210. For example, as shown, the registration information may indicate that communication device 230 is to provide an alert to the second registered user device 210 five minutes after communication device 230 provides an alert to the first registered user device 210 (e.g., when communication device 230 does not receive a response to the alert provided to the first registered user device 210 within five minutes).

As shown by reference number 535, communication device 230 may also receive registration information associated with a threshold for automatically tracking vehicle 220. For example, as shown, the registration information may indicate that communication device 230 is to automatically track vehicle 220 twenty minutes after providing the first alert to the first registered user device 210 (e.g., when communication device 230 does not receive a response to any alert provided by communication device 230 within 20 minutes of providing the first alert to the first registered user device 210).

As shown by reference number 540, communication device 230 may receive (e.g., based on a user selection of an OK button) an indication that the user has finished providing the registration information, and communication device 230 may store the registration information accordingly.

As indicated above, FIG. 5 is provided merely as an example. Other examples are possible and may differ from what was described with regard to FIG. 5.

FIG. 6 is a flow chart of an example process 600 for alerting a user device based on a trigger associated with a vehicle, and providing information, associated with the vehicle, based on alerting the user device. In some implementations, one or more process blocks of FIG. 6 may be performed by communication device 230.

As shown in FIG. 6, process 600 may include detecting a trigger associated with a vehicle (block 610). For example, communication device 230 may detect a trigger associated with vehicle 220. In some implementations, communication device 230 may detect the trigger associated with vehicle 220 when communication device 230 receives information, associated with the trigger, from a component of vehicle 220.

As described above, the trigger may include an event, identified by communication device 230, that causes an alert, associated with vehicle 220, to be provided to registered user device 210. For example, the trigger may be an ignition event (e.g., when vehicle 220 starts, is powered-on, etc.), a non-zero speed event (e.g., when a speed of vehicle 220 increases above zero), a motion event (e.g., when vehicle 220 experiences a window break, an impact, a force, a shake, a vibration, is pushed, is pulled, etc.), a location change event (e.g., when vehicle 220 is moved from a first location to a second location), or the like.

In some implementations, communication device 230 may detect the trigger based on information associated with vehicle 220. For example, vehicle 220 may include an ignition component (e.g., associated with starting vehicle 220), a sensor component (e.g., a speed sensor, a motion sensor, etc.), a geolocation component (e.g., a component associated with determining a geographic location of vehicle 220), or the like. Here, one or more components of vehicle 220 may be configured to provide a notification (e.g., a notification that vehicle 220 has started, a notification that vehicle 220 is in motion, etc.). In this example, communication device 230 may detect the trigger based on the notification provided by the one or more components of vehicle 220.

In some implementations, communication device 230 may detect the trigger based on registration information stored or accessible by communication device 230. For example, as described above, communication device 230 may store or have access to registration information that identifies one or more triggers and/or information indicating whether each of the one or more triggers is to cause an alert to be provided to registered user device 210. In this example, communication device 230 may receive a notification from a particular component (e.g., the ignition component, the speed sensor, the motion sensor, etc.) of vehicle 220 and may detect the trigger accordingly (e.g., when the registration information indicates that communication device 230 is to detect a trigger based on a notification from the particular component).

As further shown in FIG. 6, process 600 may include determining registration information for a registered user device associated with the vehicle (block 620). For example, communication device 230 may determine registration information for registered user device 210 associated with vehicle 220. In some implementations, communication device 230 may determine the registration information after communication device 230 detects the trigger associated with vehicle 220.

As described above, the registration information may include information associated with registered user device 210 to which communication device 230 may provide an alert associated with vehicle 220. In some implementations, communication device 230 may determine the registration information based on information stored or accessible by communication device 230. For example, communication device 230 may receive and store the registration information, as described above. Here, communication device 230 may detect the trigger, associated with vehicle 220, and may determine the registration information based on the stored registration information.

As further shown in FIG. 6, process 600 may include determining whether the registered user device is near the vehicle (block 630). For example, communication device 230 may determine whether registered user device 210 is near vehicle 220. In some implementations, communication device 230 may determine whether registered user device 210 is near vehicle 220 after communication device 230 determines the registration information. Additionally, or alternatively, communication device 230 may determine whether registered user device 210 is near vehicle 220 after communication device 230 detects the trigger associated with vehicle 220.

In some implementations, communication device 230 may determine whether registered user device 210 is near vehicle 220 based on the registration information. For example, assume that the registration information includes information that identifies registered user device 210 (e.g., an IP address, a Bluetooth address, a NFC chip identifier, etc.). Here, communication device 230 may determine whether registered user device 210 is near vehicle 220 by sending (e.g., via WiFi, via Bluetooth, via NFC, etc.) a query to registered user device 210, and waiting for a response to the query. In this example, if communication device 230 does not receive a response to the query within a threshold amount of time (e.g., a default threshold amount of time, a threshold amount of time identified in the registration information), then communication device 230 may determine that registered user device 210 is not near vehicle 220. In some implementations, communication device 230 may send the query to registered user device 210 without requiring an action by an operator and/or occupant of vehicle 220 (i.e., the operator and/or occupant of vehicle 220 may not be made aware that communication device 230 sends the query).

In some implementations, registered user device 210 may respond to the query without an action by the user of registered user device 210. For example, communication device 230 may be configured to automatically (e.g., without user interaction) respond to a query sent via WiFi and/or via Bluetooth (e.g., when registered user device 210 is within WiFi range and/or Bluetooth range of communication device 230). As such, communication device 230 may determine that registered user device 210 is near vehicle 220 without requiring user action.

Additionally, or alternatively, registered user device 210 may respond to the query with an action by the user. For example, communication device 230 may send the query via NFC, and registered user device 210 may respond to the query when the user of registered user device 210 holds registered user device 210 in close proximity (e.g., three centimeters, ten centimeters, twenty-five centimeters, etc.) of an NFC chip associated with communication device 230. As such, communication device 230 may determine that registered user device 210 is near vehicle 220 based on the user action associated with registered user device 210.

In some implementations, communication device 230 may determine whether registered user device 210 is near vehicle 220 via one or more wireless technologies identified by the registration information. For example, the registration information may indicate that communication device 230 is to determine whether registered user device 210 is near vehicle 220 via Bluetooth and/or NFC, and communication device 230 may determine whether registered user device 210 is near vehicle 220 accordingly.

Additionally, or alternatively, communication device 230 may determine whether multiple registered user devices 210 are near vehicle 220. For example, the registration information may identify a first registered user device 210, a second registered user device 210, and a third registered user device 210. Here, communication device 230 may determine (e.g., in series, concurrently, etc.) whether the first registered user device 210, the second registered user device 210, and/or the third registered user device 210 are near vehicle 220.

In some implementations, communication device 230 may determine that registered user device 210 is near vehicle 220 (e.g., when communication device 230 receives a response to the query provided by communication device 230). Alternatively, communication device 230 may determine that registered user device 210 is not near vehicle 220 (e.g., when communication device 230 does not receive a response to the query provided by communication device 230).

As further shown in FIG. 6, if the registered user device is near the vehicle (block 630—YES), then process 600 may include not performing an action associated with the vehicle (block 640). For example, communication device 230 may determine that registered user device 210 is near vehicle 220, and communication device 230 may not track vehicle 220 (e.g., when communication device 230 is configured not to send an alert to registered user device 210 and/or track vehicle 220 when registered user device 210 is near vehicle 220).

As further shown in FIG. 6, if the registered user device is not near the vehicle (block 630—NO), then process 600 may include providing, to the registered user device, an alert associated with the vehicle (block 650). For example, communication device 230 may determine that registered user device 210 is not near vehicle 220, and communication device 230 may provide, to registered user device 210, an alert associated with vehicle 220. In some implementations, communication device 230 may provide the alert to registered user device 210 after communication device 230 determines that registered user device 210 is not near vehicle 220.

As described above, the alert may include a message associated with determining whether communication device 230 is cause an action, associated with vehicle 220 to be performed. For example, the alert may include a message associated with determining whether communication device 230 is to track vehicle 220. Other examples of the action may include disabling vehicle 220 (e.g., turning off vehicle 220 when communication device 230 determines that vehicle 220 may be safely disabled), establishing a connection for communications associated with vehicle 220 (e.g., opening a channel to a speaker and a microphone of vehicle 220 to speak with an occupant of vehicle 220, etc), sending a message (e.g., sending a text message to a particular user device), or the like. Notably, while implementations and/or methods described herein are described in the context of the action being associated with tracking vehicle 220, these implementations and/or methods may equally apply to one or more other types of actions, such as those listed above.

In some implementations, the alert may include a SMS message, a MMS message, a voice message, a video message, an email, or the like. In some implementations, the alert may include an inquiry associated with determining whether communication device 230 is to cause an action, associated with vehicle 220, to be performed. For example, the alert may indicate that communication device 230 has detected a trigger, and may inquire (e.g., to the user of registered user device 210) whether communication device 230 is to track vehicle 220. In some implementations, communication device 230 may provide the alert via a cellular network (e.g., network 240) via which communication device 230 is capable of communicating with registered user device 210.

In some implementations, the alert may include location information associated with vehicle 220. For example, the alert may include a set of GPS coordinates that identify a geographic location of vehicle 220 at the time that communication device 230 detected the trigger. As another example, the alert may include information that identifies a cell, associated with network 240, in which vehicle 220 was located at the time that communication device 230 detected the trigger.

In some implementations, communication device 230 may provide multiple alerts to registered user device 210 identified by the registration information. For example, communication device 230 may provide a first alert to registered user device 210. Here, if communication device 230 does not receive a response to the first alert within a threshold amount of time (e.g., a default threshold amount of time, a threshold amount of time identified in the registration information, etc.), then communication device 230 may send a second alert to registered user device 210.

Additionally, or alternatively, communication device 230 may provide the alert to multiple registered user devices 210 identified by the registration information. For example, communication device 230 may provide a first alert to a first registered user device 210. Here, if communication device 230 does not receive, from the first registered user device 210, a response to the first alert within a first threshold amount of time, then communication device 230 may provide a second alert to a second registered user device 210. As another example, communication device 230 may concurrently provide the alert to the first registered user device 210 and the second registered user device 210.

In some implementations, communication device 230 may not receive a response to one or more alerts (e.g., provided to one or more registered user devices 210), and communication device 230 may automatically cause the action, associated with vehicle 220, to be performed. For example, assume that communication device 230 provides a set of alerts to a set of registered user devices 210 over a period of time. Here, if communication device 230 does not receive a response to any alert, then communication device 230 may periodically (e.g., every minute, every ten minutes, etc.) determine location information associated with tracking vehicle 220. In this case, communication device 230 may automatically provide the location information to the set of registered user devices 210 and/or may store the location information (e.g., such that the location information may be provided to the set of registered user devices 210 at a later time). In some implementations, communication device 230 may continue (e.g., periodically) providing, to the set of registered user devices 210, the location information and/or additional alerts (e.g., until communication device 230 receives a response an alert).

As further shown in FIG. 6, process 600 may include receiving a response to the alert associated with the vehicle (block 660). For example, communication device 230 may receive a response to the alert associated with tracking vehicle 220. In some implementations, communication device 230 may receive the response to the alert after communication device 230 provides the alert. Additionally, or alternatively, communication device 230 may receive the response to the alert after registered user device 210 provides the response to the alert. In some implementations, communication device 230 may receive the response to the alert via the cellular network (e.g., network 240) via which communication device 230 is capable of communicating with registered user device 210.

In some implementations, the response may include an indication whether communication device 230 is to cause the action, associated with vehicle 220, to be performed. For example, the response may include an indication whether communication device 230 is to determine location information associated with tracking vehicle 220. Here, the response may include an indication that communication device 230 is to determine location information associated with tracking vehicle 220 (e.g., when the user of registered user device 210 wishes for communication device 230 to track vehicle 220). As another example, the response may include an indication that communication device 230 is not to determine location information associated with tracking vehicle 220 (e.g., when the user of registered user device 210 does not wish for communication device 230 to track vehicle 220).

Additionally, or alternatively, the response may include a passcode associated with registered user device 210. For example, the response may include a passcode, provided via user input to registered user device 210, associated with validating the response (e.g., in order to protect against cloning and/or spoofing of registered user device 210).

As further shown in FIG. 6, process 600 may include determining whether to cause the action, associated with the vehicle, to be performed (block 670). For example, communication device 230 may determine whether to track vehicle 220 based on the response to the alert. In some implementations, communication device 230 may determine whether to track vehicle 220 after communication device 230 receives the response to the alert.

In some implementations, communication device 230 may determine whether the action, associated with vehicle 220, is to be performed based on the response to the alert. For example, communication device 230 may determine whether to track vehicle 220 based on the response to the alert. Here, the response may include information indicating that communication device 230 is to track vehicle 220. As another example, the response may include information indicating that communication device 230 is not to track vehicle 220.

In some implementations, communication device 230 may compare a passcode, included in the response, to a passcode included in the registration information. Here, if the passcode included in the response matches the passcode included in the registration information, then communication device 230 may act in accordance with the response (e.g., by beginning to track vehicle 220, by not tracking vehicle 220). Alternatively, the passcode included in the registration information may not match the passcode included in the registration information. Here, communication device 230 may notify registered user device 210 that the passcode is incorrect (e.g., such the user may reenter the passcode) and/or may (e.g., automatically) begin tracking vehicle 220 (e.g., after communication device 230 receives a threshold quantity of incorrect passcodes from registered user device 210).

As further shown in FIG. 6, if the action is not to be performed (block 670—NO), then process 600 may include not performing the action associated with the vehicle (block 640). For example, communication device 230 may determine, based on the response, that vehicle 220 is not to be tracked, and communication device 230 may not track vehicle 220.

As further shown in FIG. 6, if the action, associated with the vehicle, is to be performed (block 670—YES), then process 600 may include causing the action, associated with the vehicle, to be performed (block 680). For example, communication device 230 may determine that vehicle 220 is to be tracked, and communication device 230 may provide location information associated with tracking vehicle 220. In some implementations, communication device 230 may provide the location information associated with tracking vehicle 220 after communication device 230 determines that communication device 230 is to track vehicle 220. In some implementations, communication device 230 may provide the location information via the cellular network (e.g., network 240) via which communication device 230 is capable of communicating with registered user device 210.

The location information may include information that identifies a geographic location of vehicle 220. For example, the location information may include a set of GPS coordinates, a location associated with a cell of network 240, or the like. In some implementations, communication device 230 may periodically determine the location information associated with vehicle 220. For example, communication device 230 may determine location information every one second, every five seconds, every one minute, every ten minutes, or the like.

In some implementations, communication device 230 may provide the location information to registered user device 210. For example, communication device 230 may provide the location information to registered user device 210 each time communication device 230 determines the location information (e.g., every one second, every five seconds, every one minute, every ten minutes, etc.). In some implementations, the rate at which communication device 230 provides the location information may be configured by the user of registered user device 210. Additionally, or alternatively, communication device 230 may provide the location information for storage by communication device 230 (e.g., such that communication device 230 may provide the location information to registered user device 210 at a later time) or a server (e.g., such that communication device 230 may provide the location information to the server and registered user device 210 may retrieve the location information from the server at a later time).

In some implementations, communication device 230 may provide the location information such that the user of registered user device 210 may view the location information. For example, communication device 230 may provide the location information to registered user device 210. Here, registered user device 210 may provide, for display via a display screen, the location information in the form of a map, a list of GPS coordinates, or the like. In some implementations, communication device 230 may provide (e.g., concurrently, in a sequence) the location information (e.g., a list of GPS coordinates), and registered user device 210 may plot the location information on a map for display to the user. Additionally, or alternatively, communication device 230 may provide the location information to registered user device 210, and registered user device 210 may store the location information (e.g., such that the user may view the location information at a later time).

Additionally, or alternatively, communication device 230 may cause another type of action to be performed. For example, communication device 230 may cause vehicle 220 to be disabled (e.g., when communication device 230 determines that vehicle 220 may be safely disabled, such as when communication device 230 determines that vehicle 220 has stopped), cause a connection for communications associated with vehicle 220 to be established, cause a message to be sent (e.g., to a display screen associated with communication device 230, to a particular user device, etc.), or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
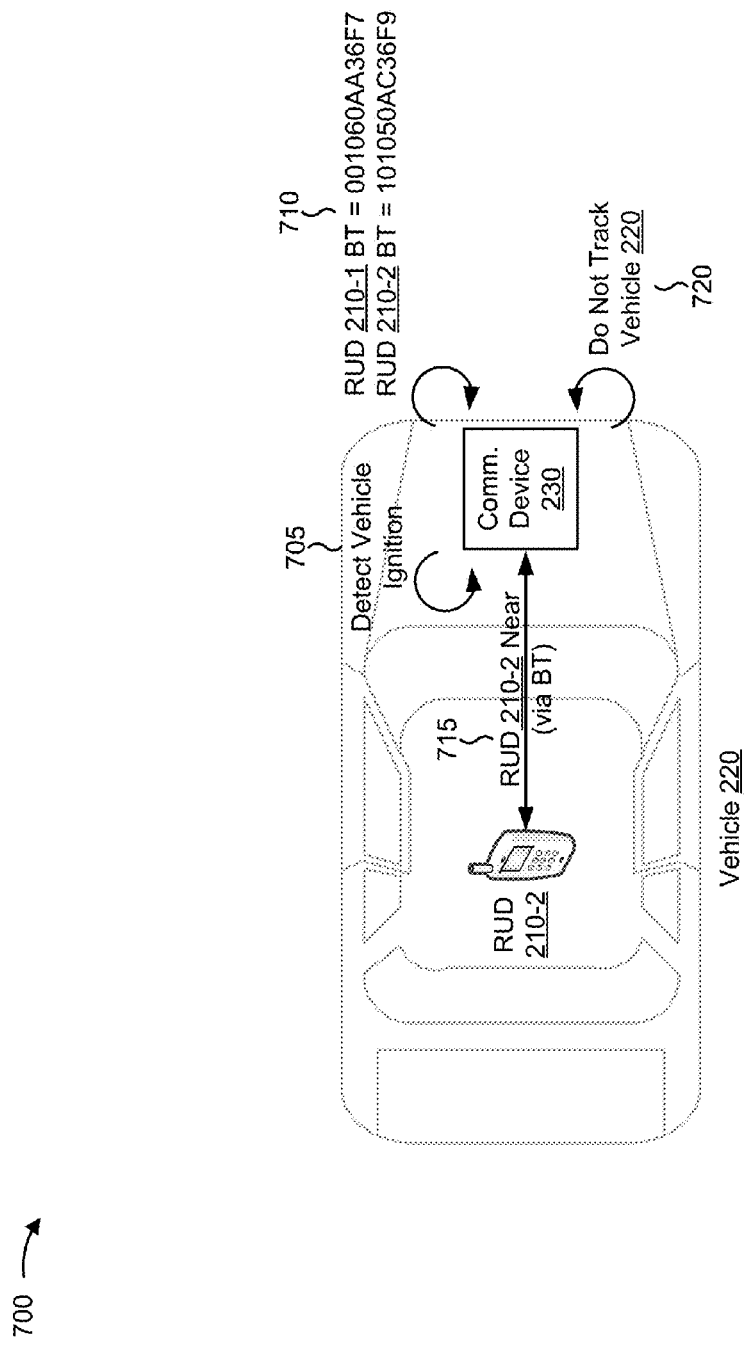
FIG. 7 is a diagram of an example implementation relating to the example process shown in FIG. 6.

FIG. 7 is a diagram of an example implementation 700 relating to example process 600 shown in FIG. 6. For the purposes of example implementation 700, assume that vehicle 220 includes communication device 230 capable of determining location information associated with vehicle 220. Further, assume that communication device 230 is capable of communicating via a cellular network (e.g., network 240), and that communication device 230 stores registration information that identifies a first registered user device 210 (e.g., RUD 210-1) associated with vehicle 220 and a second registered user device 210 (e.g., RUD 210-2), associated with vehicle 220, as described above with regard to example implementation 500.

As shown in FIG. 7, and by reference number 705, communication device 230 may detect a trigger associated with tracking vehicle 220. For example, communication device 230 may detect an ignition event (i.e., that vehicle 220 has started), and may determine (e.g., based on the registration information stored by communication device 230) that the ignition event is a trigger associated with vehicle 220. As shown by reference number 710, communication device 230 may determine (e.g., based on the registration information) whether the first registered user device and/or the second registered user device are near vehicle 220 via Bluetooth. As shown, communication device 230 may determine a first Bluetooth address corresponding to the first registered user device (e.g., the first registered user device BT=001060AA36F7) and a second Bluetooth address corresponding to the second registered user device (e.g., the second registered user device BT=101050AC36F9).

As shown by reference number 715, communication device 230 may determine that the second registered user device is near vehicle 220. For example, communication device 230 may send, to the second registered user device, a query associated with communicating via Bluetooth, and may determine, based on receiving a response to the query, that the second registered user device is near vehicle 220. As shown by reference number 720, since communication device 230 determines that the second registered user device is near vehicle 220, communication device 230 may not track vehicle 220.

As indicated above, FIG. 7 is provided merely as an example. Other examples are possible and may differ from what was described with regard to FIG. 7.

Figure 8A:
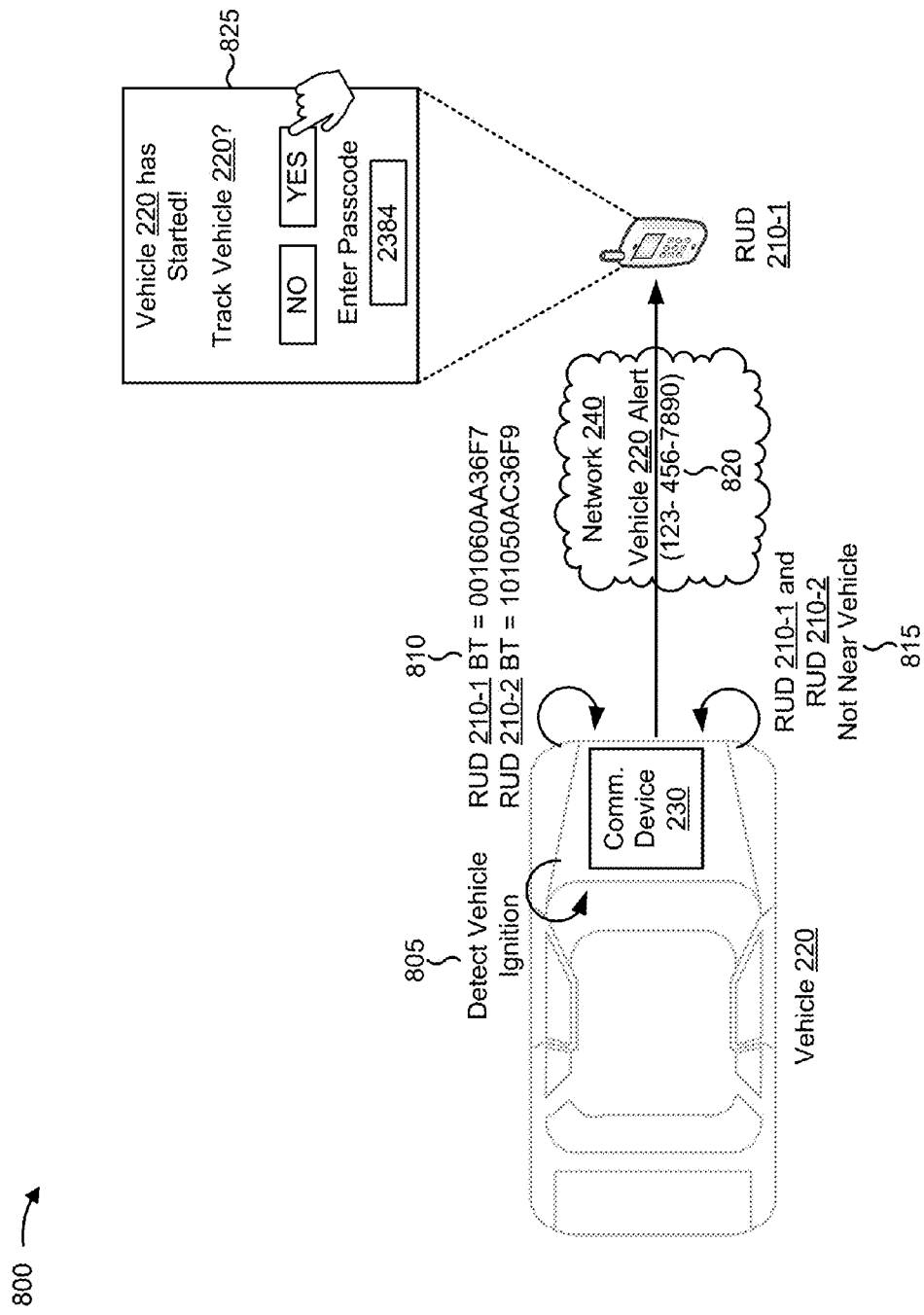
FIGS. 8A and 8B are diagrams of an additional example implementation relating to the example process shown in FIG. 6.
Figure 8B:
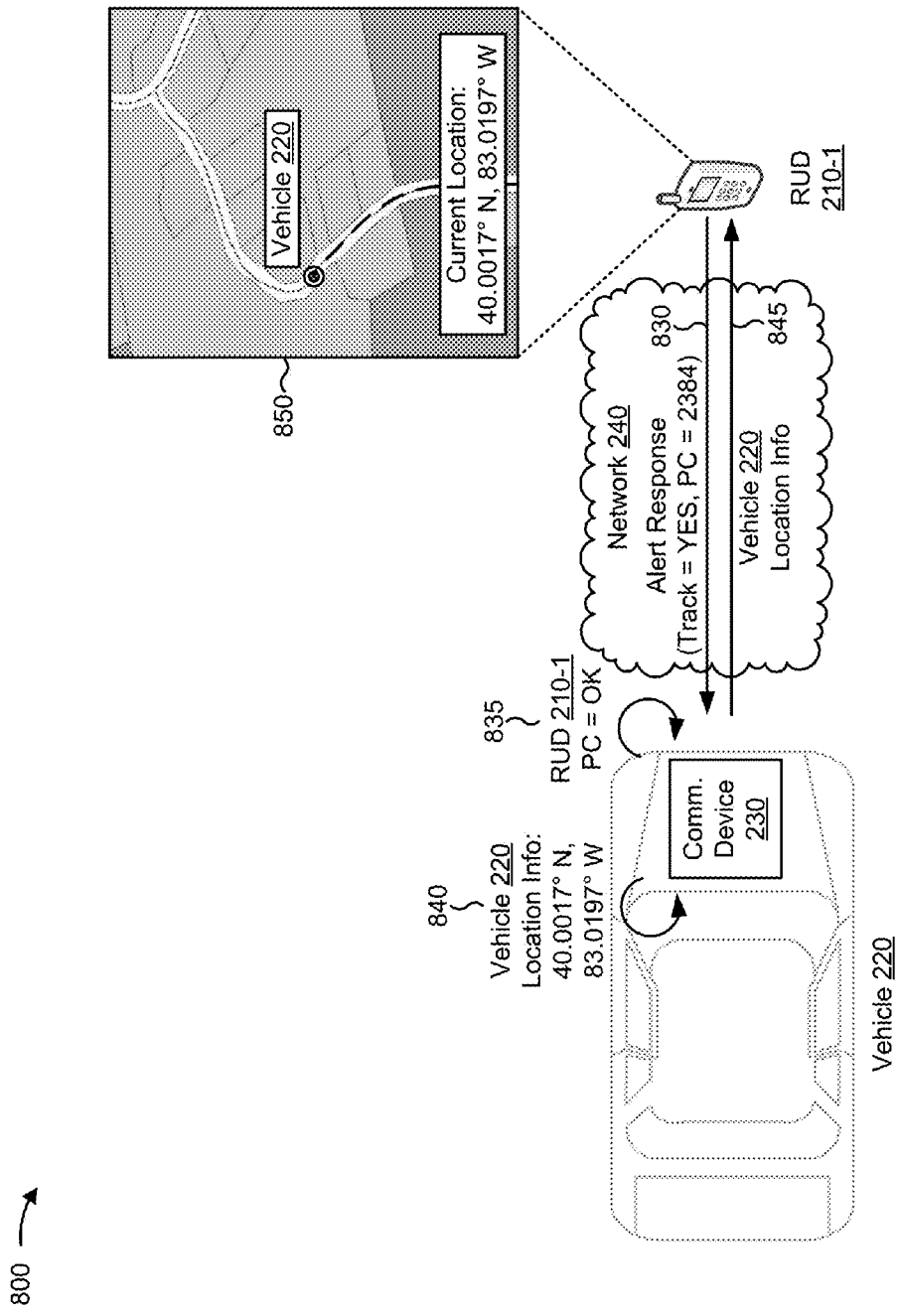

FIGS. 8A and 8B are diagrams of an additional example implementation 800 relating to example process 600 shown in FIG. 6. For the purposes of example implementation 800, assume that vehicle 220 includes communication device 230 capable of determining location information associated with vehicle 220. Further, assume that communication device 230 is capable of communicating via a cellular network (e.g., network 240), and that communication device 230 stores registration information that identifies a first registered user device 210 (e.g., RUD 210-1) associated with vehicle 220 and a second registered user device 210 (e.g., RUD 210-2), associated with vehicle 220, as described above with regard to example implementation 500.

As shown in FIG. 8A, and by reference number 805, communication device 230 may detect a trigger associated with tracking vehicle 220. For example, communication device 230 may detect an ignition event (i.e., that vehicle 220 has started), and may determine (e.g., based on the registration information stored by communication device 230) that the ignition event is a trigger associated with vehicle 220. As shown by reference number 810, communication device 230 may determine (e.g., based on the registration information) whether the first registered user device and/or the second registered user device are near vehicle 220 via Bluetooth. As shown, communication device 230 may determine a first Bluetooth address corresponding to the first registered user device (e.g., the first registered user device BT=001060AA36F7) and a second Bluetooth address corresponding to the second registered user device (e.g., the second registered user device BT=101050AC36F9). As shown by reference number 815, communication device 230 may determine that neither the first registered user device nor the second registered user device is near vehicle 220. For example, communication device 230 may send, to the first registered user device and the second registered user device, a query associated with communicating via Bluetooth, and may determine, based on waiting for a threshold amount of time without receiving a response from either the first registered user device or the second registered user device, that neither the first registered user device nor the second registered user device is near vehicle 220.

As shown by reference number 820, since neither the first registered user device nor the second registered user device is near vehicle 220, communication device 230 may provide, to the first registered user device, an alert associated with vehicle 220 (e.g., since the registration information indicates that the alert is to be provided to the first registered user device first). As shown, communication device 230 may provide the alert (e.g., an SMS) via a cellular network (e.g., network 240) and based on the registration information that identifies the first registered user device (e.g., 123-456-7890). As shown by reference number 825, the first registered user device may receive the alert, and may display information associated with the alert to a user (e.g., "Vehicle 220 has started! Track vehicle 220?"). As shown, the user may indicate (e.g., by selecting a Yes button) that the user wishes for communication device 230 to track vehicle 220. As further shown, the user may provide (e.g., via a textbox) a passcode associated with the first registered user device (e.g., Enter Passcode: 2384).

As shown in FIG. 8B, and by reference number 830, the first registered user device may provide a response to the alert that includes information, indicating that communication device 230 is to track vehicle 220, and the passcode provided by the user. As shown by reference number 835, communication device 230 may receive the response to the alert and may determine, based on the registration information, that the passcode included in the response matches the passcode included in the registration information (e.g., RUD 210-1 PC=OK). As shown by reference number 840, communication device 230 may determine location information associated with vehicle 220 (e.g., 40.0017° N, 83.0197° W). As shown by reference number 845, communication device 230 may provide the location information to the first registered user device. As shown, the first registered user device may provide the location information for viewing by the user. Communication device 230 may continue (e.g., periodically) determining updated location information associated with vehicle 220, and providing the updated location information accordingly (e.g., such that the first registered user device periodically receives the updated location information).

As indicated above, FIGS. 8A and 8B are provided merely as an example. Other examples are possible and may differ from what was described with regard to FIGS. 8A and 8B.

Implementations described herein may allow a user to cause an action, associated with a vehicle, to be performed (e.g., on-demand) when the user is not within or near the vehicle. Implementations described herein may also provide the user with on-demand vehicle tracking via a cellular network without requiring the user to subscribe to a vehicle tracking service and without requiring the user to install an external device within and/or on the vehicle.

The foregoing disclosure provides illustration and description, but is not intended to be exhaustive or to limit the implementations to the precise form disclosed. Modifications and variations are possible in light of the above disclosure or may be acquired from practice of the implementations.

For example, while implementations described herein are described in the context of registered user device 210 providing a response to an alert provided by communication device 230, in some implementations, registered user device 210 may provide, to communication device 230 (e.g., via the cellular network) a request associated with tracking vehicle 220. In this example, registered user device 210 may provide, to communication device 230, an indication that communication device 230 is to track vehicle 220 (and the passcode associated with registered user device 210), and communication device 230 may begin tracking vehicle 220 accordingly. In this way, registered user device 210 need not wait to receive an alert before causing communication device 230 to track vehicle 220.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      detect a trigger associated with a vehicle;
      determine registration information of a user device, associated with the vehicle and communicable with a communication device of the vehicle, based on detecting the trigger,
         the registration information including:
            at least one of a number or address of the user device, and
            information for determining whether the user device is determined to be within a particular distance of the vehicle;
      determine whether the user device is within the particular distance of the vehicle based on the registration information;
      selectively provide, to the user device, an alert associated with the vehicle,
         the alert being provided via a communications network, and
         the alert being provided to the user device based on determining that the user device is not within the particular distance of the vehicle;
      determine, after providing the alert to the user device, that an action, associated with the vehicle, is to be performed; and
      cause the action, associated with the vehicle, to be performed.

2. The device of claim 1, where the trigger includes at least one of:
   an ignition event associated with the vehicle;
   a non-zero speed event associated with the vehicle;
   a motion event associated with the vehicle; or
   a location change event associated with the vehicle.

3. The device of claim 1, where the one or more processors are further to:
   receive the registration information,
      the registration information being received based on user input; and
   where the one or more processors, when determining the registration information, are to:
      determine the registration information based on the received registration information.

4. The device of claim 1, where the one or more processors are further to:
   provide a query to the user device; and
   where the one or more processors, when determining whether the user device is within the particular distance of the vehicle, are to:
      determine that the user device is not within the particular distance of the vehicle based on failing to receive a response to the query within threshold amount of time of providing the query.

5. The device of claim 1, where the one or more processors are further to:
   receive a response to the alert,
      the response being based on user input and being received via the communications network, and
      the response indicating that the vehicle is to be tracked; and
   where the one or more processors, when determining that the action, associated with the vehicle, is to be performed, are to:

determine that the vehicle is to be tracked based on the response to the alert.

6. The device of claim 1, where the one or more processors are further to:
periodically provide, via the communications network, location information associated with tracking the vehicle.

7. The device of claim 1, where the one or more processors, when determining that the action is to be performed, are to:
determine that the action is to be performed based failing to receive a response to the alert within a threshold amount of time after providing the alert.

8. A computer-readable medium storing instructions, the instructions comprising:
one or more instructions that, when executed by one or more processors, cause the one or more processors to:
detect a trigger associated with a vehicle;
determine registration information of a user device, associated with the vehicle and communicable with a communication device of the vehicle, based on detecting the trigger,
the registration information including:
at least one of a number or address of the user device,
information for determining whether the user device is within a particular distance of the vehicle, and
information identifying a set of user devices associated with the vehicle;
determine whether a user device, of the set of user devices, is within a particular communication range associated with the vehicle based on the registration information;
selectively provide, to at least one user device, of the set of user devices, an alert associated with the vehicle,
the alert being provided based on determining that no user device, of the set of user devices, is within the particular communication range associated with the vehicle, and
the alert being provided via a communications network;
determine, after providing the alert to the at least one user device, that an action, associated with the vehicle, is to be performed; and
cause the action, associated with the vehicle, to be performed.

9. The computer-readable medium of claim 8, where the one or more instructions, when executed by the one or more processors, further cause the one or more processors to:
receive registration information associated with the set of user devices,
the registration information being received based on user input and including information associated with the set of user devices; and
where the one or more instructions, that cause the one or more processors to determine the registration information, cause the one or more processors to:
determine the registration information based on receiving the registration information.

10. The computer-readable medium of claim 8, where the one or more instructions, when executed by the one or more processors, further cause the one or more processors to:
provide a set of queries to the set of user devices,
a query, of the set of queries, being provided to a user device of the set of user devices; and
where the one or more instructions, that cause the one or more processors to determine whether a user device, of the set of user devices, is within the particular communication range associated with the vehicle, cause the one or more processors to:
determine that no user device, of the set of user devices, is within the particular communication range associated with the vehicle based on failing to receive a response to any query, of the set of queries, within a threshold amount of time after providing the set of queries.

11. The computer-readable medium of claim 8, where the one or more instructions, when executed by the one or more processors, further cause the one or more processors to:
receive a response to the alert via the communications network,
the response including a first passcode associated with the at least one user device;
determine that the first passcode matches a second passcode associated with the at least one user device,
the second passcode being included in the registration information; and
where the one or more instructions, that cause the one or more processors to determine that the action, associated with the vehicle, is to be performed, cause the one or more processors to:
determine that the action is to be performed based on the response to the alert.

12. The computer-readable medium of claim 8, where the one or more instructions, that cause the one or more processors to determine that the action is to be performed, cause the one or more processors to:
determine that the action is to be performed based failing to receive a response to the alert within a threshold amount of time after providing the alert.

13. The computer-readable medium of claim 8, where the one or more instructions, when executed by the one or more processors, further cause the one or more processors to:
provide, after failing to receive a response to the alert within a threshold amount of time after providing the alert, another alert to another user device of the set of user devices,
the other alert being provided via the communications network; and
receive a response to the other alert via the communications network; and
where the one or more instructions, that cause the one or more processors to determine that the action is to be performed, cause the one or more processors to:
determine that the action is to be performed based on receiving the response to the other alert.

14. The computer-readable medium of claim 8, where the one or more instructions, when executed by the one or more processors, further cause the one or more processors to:
periodically provide, via the communications network, location information associated with tracking the vehicle.

15. A method, comprising:
detecting, by a device, a trigger associated with a vehicle;
determining, by the device and based on detecting the trigger, registration information of a user device,
the user device being associated with the vehicle and communicable with a communication device of the vehicle,
the registration information including:
at least one of a number or address of the user device, information that identifies the user device associated with the vehicle, and information for determining whether the user device is in proximity of the vehicle;

determining, by the device, whether the user device is in proximity to the vehicle based on the registration information;

selectively sending, by the device, an alert associated with the vehicle, the alert being sent to the user device based on determining that the user device is not in proximity to the vehicle;

determining, by the device and after sending the alert to the user device, that the vehicle is to be tracked; and sending, by the device, location information associated with tracking the vehicle.

16. The method of claim 15, further comprising:

receiving the registration information based on user input; and where determining the registration information comprises:

determining the registration information based on the received registration information.

17. The method of claim 15, further comprising:

sending a query to the user device; and where determining whether the user device is in proximity to the vehicle comprises:

determining that the user device is not in proximity to the vehicle based on failing to receive a response to the query within a threshold amount of time after sending the query.

18. The method of claim 15, further comprising:

receiving a response to the alert, the response being based on user input, and the response indicating that the vehicle is to be tracked; and where determining that the vehicle is to be tracked comprises:

determining that the vehicle is to be tracked based on the response to the alert.

19. The method of claim 15, where determining that the vehicle is to be tracked comprises:

determining that the vehicle is to be tracked based on failing to receive a response to the alert within a threshold amount of time after sending the alert.

20. The method of claim 15, further comprising:

sending, after failing to receive a response to the alert within a threshold amount of time after sending the alert, another alert to the user device; and receiving a response to the other alert; and where determining that the vehicle is to be tracked comprises:

determining that the vehicle is to be tracked based on receiving the response to the other alert.

* * * * *